United States Patent [19]

Yamada et al.

[11] Patent Number: 5,540,874
[45] Date of Patent: Jul. 30, 1996

[54] CELLULOSE SOLUTION FOR SHAPING AND METHOD OF SHAPING THE SAME

[75] Inventors: Teruyuki Yamada; Yuichi Fukui; Seiji Hayashi; Kei Murase, all of Otake, Japan

[73] Assignee: Mitsubishi Rayon Company Ltd., Tokyo, Japan

[21] Appl. No.: 318,679

[22] PCT Filed: Feb. 10, 1994

[86] PCT No.: PCT/JP94/00206

§ 371 Date: Oct. 17, 1994

§ 102(e) Date: Oct. 17, 1994

[87] PCT Pub. No.: WO94/19405

PCT Pub. Date: Sep. 1, 1994

[30] Foreign Application Priority Data

Feb. 16, 1993 [JP] Japan ..................................... 5-026911

[51] Int. Cl.[6] .................. D01F 2/24; D01F 2/28
[52] U.S. Cl. ................ 264/187; 106/162.71; 106/162.8; 106/162.9; 106/200.2; 264/200; 264/203; 264/211.12; 536/56; 536/58; 536/63; 536/69
[58] Field of Search ..................................... 264/187, 200, 264/203, 211.12, 211.13, 211.14; 106/163.1, 169, 186, 198, 203; 536/56, 58, 63, 69

[56] References Cited

U.S. PATENT DOCUMENTS

| | | |
|---|---|---|
| 4,142,913 | 3/1979 | McCorsley, III et al. . |
| 4,144,080 | 3/1979 | McCorsley, III . |
| 4,211,574 | 7/1980 | McCorsley, III et al. . |
| 4,246,221 | 1/1981 | McCorsley, III . |
| 4,416,698 | 11/1983 | McCorsley, III . |
| 4,426,228 | 1/1984 | Brandner et al. . |
| 4,880,469 | 11/1989 | Chanzy et al. . |
| 4,983,730 | 1/1991 | Domeshek et al. . |
| 5,252,284 | 10/1993 | Jurkovic et al. . |

FOREIGN PATENT DOCUMENTS

| | | |
|---|---|---|
| 1-193338 | 8/1989 | Japan . |
| 3-29819 | 4/1991 | Japan . |

*Primary Examiner*—Leo B. Tentoni
*Attorney, Agent, or Firm*—Oblon, Spivak, McClelland, Maier & Neustadt, P.C.

[57] ABSTRACT

A cellulose solution having excellent fluidity and formability is prepared by dissolving a cellulose composition containing a component (I) of cellulose having a polymerization degree of 500 to 1000, and a component (II) of at least one member selected from celluloses having a polymerization degree corresponding to 90% of that of the component (I) cellulose and being in the range of from 350 to 900, cellulose derivatives and polysaccharides, the mixing ratio of the component (I) to the component (II) being 95:5 to 50:50, in a mixed solvent comprising N-methylmorpholine-N-oxide and another solvent material compatible with N-methylmorpholine-N-oxide but not capable of dissolving cellulose therein, and the resultant cellulose solution being useful for producing shaped articles, for example, fibers and films.

10 Claims, No Drawings

CELLULOSE SOLUTION FOR SHAPING AND METHOD OF SHAPING THE SAME

TECHNICAL FIELD

The present invention relates to a cellulose solution for shaping and a method of shaping the same. More particularly, the present invention relates to a cellulose solution capable of stably forming therefrom filaments or films at a high velocity and a method of shaping the cellulose solution, especially a spinning method of the cellulose filaments.

BACKGROUND ART

The viscose rayon method and cupro-ammonia method are well known as methods for producing cellulose filaments or fibers. These conventional methods are disadvantageous in that the solvents for cellulose are difficult to recycle and the discharge of the solvent causes environmental pollution.

In consideration of environmental safety, Japanese Examined Patent Publication No. 60-28848 (which corresponds to U.S. Pat. Nos. 4,246,221 and 4,416,698) discloses a method of producing shaped cellulose articles, for example, filaments or fibers or films, by dissolving cellulose in N-methylmorpholine-N-oxide to provide a dope solution, and then shaping the cellulose dope solution. This method is advantageous in that the solvent for cellulose can be recoved from the dope solution and reused.

Japanese Unexamined Patent Publication No. 4-308220 or the corresponding U.S. Pat. No. 5,252,284 discloses a method of spinning the cellulose solution similar to that mentioned above through a spinning nozzle having a small hole diameter at a low spinning draft to form small denier filaments.

Generally, the solution of cellulose in N-methylmorpholine-N-oxide has a high viscosity and exhibites significant elastomeric behavior. Since this high viscosity solution is difficult to deform, it is difficult to make a large spinning draft ratio (the ratio of the take-up velocity to an extruding velocity of solution through a nozzle orifice).

Also, where the shaping procedure is carried out by using a nozzle having a small orifice diameter or a slit having a small width, an increase in the extrusion rate of the solution results in the generation of melt fractures which means a melt flow instability of the solution through a nozzle orifice. Therefore, the shaping conditions under which the solution can be stably shaped are limited to a range in which melt fractures are not generated, and this limitation reduces productivity.

To conduct the shaping procedure without reducing the productivity, the viscosity of the solution is reduced. Where a low viscosity solution is used, the generation of melt fractures is restricted and thus the shaping stability of the solution is enhanced. Also, since a low viscosity solution can be easily deformed, it is possible to increase the spinning draft ratio and take-up velocity of the filaments. Generally, the viscoelastic behavior of a solution of a polymeric substance is variable depending on the concentration and temperature of the solution and the molecular weight of the polymeric substance in the solution. Generally, to reduce the viscosity of a polymeric substance solution, the concentration of the polymeric substance in the solution is reduced or the molecular weight of the polymeric substance is reduced.

However, the reduction of the concentration of the polymeric substance in the solution is disadvantageously reduces the productivity of the shaped products, and the load on the system for recovering the solvent is increased. Also, if a polymeric substance having a low molecular weight is used for the shaping solution, the resultant articles have disadvantageously unstable physical characteristics, for example, the mechanical strength and ultimate elongation can easily vary.

U.S. Pat. No. 4,983,730 discloses a method of preparing a cellulose acetate composition having a high water solubility by blending a high molecular weight cellulose acetate with a low molecular weight cellulose having a viscosity of at least 20% below that of the high molecular weight cellulose acetate. The water-soluble cellulose acetate composition is useful for producing shaped articles having a high tensile strength. In this U.S. patent specification, no solution of cellulose, particularly in N-methylmorpholine-N-oxide, is disclosed. Also, since the cellulose acetate is a polymeric substance which is soluble in a relatively large number of solvents, it is possible to reduce the viscosity of the solution thereof. However, since the solution of cellulose in N-methylmorpholine-N-oxide has a high viscosity and exhibits a significant viscoelastic behavior, the deformation of the solution in the shaping procedure is difficult and thus it is difficult to enhance the productivity of the shaped articles from the solution.

DISCLOSURE OF THE INVENTION

An object of the present invention is to provide a cellulose solution for shaping, which can be produced substantially without reducing the molecular weight of cellulose, exhibits an enhanced shaping-processability and is capable of producing shaped articles therefrom at a high velocity with a process stability, substantially without reducing the mechanical characteristics of the resultant shaped articles, and a method of shaping the same.

The above-mentioned object can be attained by the cellulose solution for shaping of the present invention.

The cellulose solution for shaping of the present invention comprises a cellulose composition dissolved in a mixed solvent comprising N-methylmorpholine-N-oxide and another solvent material uniformly compatible with N-methylmorpholine-N-oxide but not capable of dissolving cellulose therein, the cellulose composition comprising a mixture of:

(1) a component (I) comprising a cellulose having a degree of polymerization of 500 to 2,000; and (2) a component (II) comprising at least one member selected from the group consisting of celluloses having a degree of polymerization corresponding to 90% or less that of the cellulose for the component (I) and being in the range of from 350 to 900, cellulose derivatives and polysaccharides; and the mixing ratio in weight of the component (I) to the component (II) being in the range of from 95:5 to 50:50.

The cellulose shaping method of the present invention comprises shaping the cellulose solution mentioned above into a stream thereof having a desired form; and solidifying the shaped cellulose solution stream by bringing it into contact with a coagulating liquid.

Particularly, the cellulose shaping method includes a cellulose filament-spinning method in which the cellulose solution is extruded to the air atmosphere through a spinning nozzle having at least one spinning orifice; the extruded filamentary cellulose solution stream is brought into contact with the coagulating liquid to coagulate it while applying a draft thereto; and the coagulated cellulose filament is taken up from the coagulating liquid, thereby to produce a cellulose filament.

BEST MODE OF CARRYING OUT THE INVENTION

The cellulose component (I) usable for the present invention comprises a cellulose having a degree of polymerization of 500 to 2,000, preferably 1,000 to 2,000. If the polymerization degree is less than 500, the resultant shaped article exhibits unsatisfactory mechanical properties for example, tensile strength and ultimate elongation. If the polymerization degree is more than 2,000, the resultant cellulose solution tends to become difficult to be shaped.

For the component (II) usable for the present invention, a cellulose having a specific degree of polymerization, a cellulose derivative and a polysaccharide compound can be used. The specific cellulose usable for the component (II) must be selected from those having a degree of polymerization corresponding to 90% or less of that of the cellulose for the component (I) and being in a range of 350 to 900. If the polymerization degree is less than 350, the resultant cellulose solution is significantly discolored, and thus the discolored article and the recovered solvent are difficult to be discolored. Also, if the polymerization degree is more than 900, the formability-enhancing effect derived from the cellulose of the component (II) for the cellulose solution becomes unsatisfactory. Further, if the polymerization degree of the cellulose of the component (II) is more than 90% of that of the cellulose of the component (I), the formability-enhancing effect of the cellulose of the component (II) for the cellulose solution becomes unsatisfactory. The cellulose derivatives usable for the component (II) are not restricted to specific compounds, as long as they are soluble in the specific solvent of the present invention. Particularly, the cellulose derivatives include cellulose diacetate, cellulose triacetate, hydroxypropyl cellulose, hydroxypropylmethyl cellulose and methyl cellulose. Among those compounds, cellulose diacetate effectively enhances the formability, especially the spinning property, of the resultant cellulose solution for shaping.

The polysaccharides usable for the component (II) are not restricted to specific compounds, as long as they are soluble in the specific solvent of the present invention. Particularly, the polysaccharides include β-1,3-glucose and α-1,4-glucose. Among them, β-1,3-glucose effectively enhances the formability, especially the spinning property, of the cellulose solution for shaping.

On the cellulose composition usable for the present invention, the mixing weight ratio of the component (I) to the component (II) is from 95:5 to 50:50. If the content of the component (II) is less than 5% by weight, the effect of the enhancement of the formability especially the spinning property of the component (II) for the cellulose solution becomes unsatisfactory. Also, if the component (II) content is more than 50% by weight, the resultant shaped article exhibits unsatisfactory mechanical properties such as tensile strength and ultimate elongation.

The cellulose usable for the present invention can be selected from dissolved pulps and pulp flocks. These pulps may contain hemi-cellulose and lignin. Among these pulp materials, a pulp containing α-cellulose in a content of 90% by weight or more is preferably utilized.

The pulp usable as a cellulose material for the present invention may be in the form of a sheet or a powder. The pulp in the sheet form may be cut into chips by using a cutter, for example, a shredder. Also, the pulp may be pulverized into fine particles, unless this operation significantly reduces the molecular weight of the cellulose.

The cellulose solution of the present invention comprises the cellulose composition and a mixed solvent comprising N-methylmorpholine-N-oxide and another solvent material which is compatible with N-methylmorpholine-N-oxide, but not capable of dissolving therein cellulose, namely which is a non-solvent for cellulose.

The term "compatible with N-methylmorpholine-N-oxide" means that the solvent material and N-methylmorpholine-N-oxide are compatible with each other and can form a homogeneous solution, or a homogeneous dispersion or emulsion.

In the present invention, N-methylmorpholine-N-oxide is used as a component of the mixed solvent. Also, N-methylmorpholine-N-oxide may be mixed with another tertiary amine oxide disclosed in Japanese Examined Patent Publication Nos. 55-41691, 55-46162, and 55-41693 or the corresposponding U.S. Pat. Nos. 4,211,574, 4,142,913 and 4,144,080. The tert-amine oxide usable for the mixed solvent may be selected from cyclic mono(N-methylamine-N-oxide) compounds having the similar cyclic structure as that of N-methylmorpholine-N-oxide, for example, N-methylpiperidine-N-oxide and N-methylpyrrolidone oxide.

The non-solvent for cellulose usable for the present invention is preferably water, or a mixture of water with an alcohol selected from methyl alcohol, n-propyl alcohol, isopropyl alcohol, and butyl alcohol. Alternatively, the non-solvent for cellulose may be selected from aprotic type organic solvents which are not reactive to N-methyl-morpholine-N-oxide and to cellulose, for example, acetone, xylene, dimethyl-sulfoxide, dimethylformamide and dimethylacetamide.

The mixed solvent may contain a stabilizer. The stabilizer most preferable for the mixed solvent is propyl gallate. Other gallic acid esters, for example, methyl gallate, ethyl gallate and isopropyl gallate, disclosed in Japanese Examined Patent Publication No. 3-29,817 (or the corresponding U.S. Pat. No. 4,426,228), may be used as the stabilizer. Also, still other compounds having a carbonyl group located adjacent to a double bond, for example, glyceraldehyde, L-ascorbic acid, isoascorbic acid, triose reductone and reductic acid, can be used as the stabilizer. Further, ethylenediaminetetraacetic acid, etc. can be used as the stabilizer for the cellulose solution of the present invention. Still further, organic compounds such as calcium pyrophosphate, and calcium chloride and ammonium chloride disclosed in U.S. Pat. No. 4,880,469, can be employed as the stabilizer for the cellulose solution of the present invention.

The cellulose solution of the present invention can be prepared by a continuous method or a batch-wise method. Namely, the cellulose solution may be prepared continuously by using a screw-type extruder, etc., or batch-wise by using a tank type mix-kneader equipped with heating means and vacuum degassing means. The dissolving temperature of the cellulose composition is not limited to a specific level. Preferably, the dissolving procedure is carried out at a temperature of about 90° C. to about 120° C. If the dissolving temperature is too high, a decrease in the degree of the polymerization of cellulose due to degradation of cellulose, and decomposition and discoloration of the mixed solvent may occur to a significant extent. Also, if the dissolving temperature is too low, the dissolution of the cellulose composition may become difficult.

Preferably, the total concentration of the cellulose composition in the cellulose solution is 30% by weight or less. More preferably, in consideration of the formability of the cellulose solution and the productivity of the shaped article, the concentration of the cellulose composition is 6 to 25% by weight. Also, the contents of N-methylmorpholine-N-oxide and the non-solvent for cellulose which is compatible with N-methylmorpholine-N-oxide, contained in the mixed solvent for the cellulose solution, are 40 to 90% by weight and 5 to 22% by weight, respectively.

Where water is used as the non-solvent for cellulose, preferably in the stage of mixing the cellulose composition into the mixed solvent, the water content is 20 to 50% by weight, and then a portion of the water is removed from the dissolving system while heating the system under a reduced pressure to adjust the content of water to a level of 5 to 22% by weight.

The cellulose solution for shaping of the present invention is employed to produce shaped articles such as films or fibers. To produce the shaped articles from the cellulose solution for shaping of the present invention, the cellulose solution is shaped into a desired form, for example, film form or filament form. For this purpose, the cellulose solution for shaping is extruded through a film-forming slit or a spinning nozzle having at least one filament-forming orifice; the resultant shaped cellulose solution stream (filmy stream or filamentary stream) is brought into contact with a coagulating liquid to solidify the cellulose solution stream; and then the solidified article is taken up from the coagulating liquid.

The cellulose solution of the present invention is specifically useful for the production of cellulose filament. For the coagulating liquid, a liquid which does not dissolve therein cellulose and dissolves the mixed solvent therein, is used.

A method of producing cellulose filaments from the cellulose solution of the present invention will be explained below.

A solution of a cellulose composition in a mixed solvent is prepared by using a dissolving machine, and transferred to a spinning nozzle by, for example, a gear pump at a constant flow rate. Alternatively, the solution is cooled to solidify, the solid material is pulverized into a desired form, transferred into a melt-extruder, and heated in the extruder to dissolve again, and the resultant solution is transferred into the spinning nozzle through a gear pump at a constant flow rate.

The spinning procedures can be conducted by a conventional method in which a cellulose solution is extruded into the air atmosphere through a spinning nozzle having at least one spinning orifice, the resultant filamentary stream of the cellulose solution is brought into contact with a coagulating liquid under a draft, and the resultant coagulated cellulose filament is withdrawn from the coagulating liquid. By using the cellulose solution of the present invention, the generation of melt fractures is prevented even when the coagulated filament is taken up at a high velocity of 500 m/min or more, and thus the spinning procedure can be effected with high stability.

In the spinning method, the spinning nozzle preferably has a spinning orifice diameter D of 200 μm or more, and the ratio L/D, wherein L represents a length of the spinning orifice and D is defined as above, is 10 or more, more preferably 15 or more. The use of the specific spinning nozzle having the above-mentioned spinning orifice enables the spinning procedure to be conducted at a high draft and at a high stability. Since the cellulose solution of the present invention exhibits a significant elastic behavior, if the diameter D of the spinning orifice is less than 200 μm or the ratio L/D is less than 10, sometimes melt fractures are generated at the outlet of the spinning orifice. This phenomenon becomes significant when the extrusion velocity of the cellulose solution is high, and thus, in this case, it becomes impossible to increase the maximum spinning draft and it becomes difficult to produce uniform cellulose filaments at a high velocity and at a high stability.

Further, in the shaping method, particularly the spinning method of the present invention, the use of a ceramic.-made shaping die, particularly a spinning nozzle, prevents the generation of melt fractures at a high draft and stabilizes the spinning procedure at high velocities. Therefore, cellulose filaments having an individual filament thickness of 3.0 denier can be produced at a high velocity and with high stability.

The coagulating liquid usable for the shaping method, particularly the spinning method of the present invention is preferably prepared form at least one member selected from non-solvents for cellulose such as water and alcohols, for example, methyl alcohol, ethyl alcohol, butyl alcohol, n-propyl alcohol and isopropyl alcohol, or mixtures of the non-solvents for cellulose with N-methylmorpholine-N-oxide. The mixtures may further contain other tertiary amineoxides compatible with N-methylmorpholine-N-oxide. The coagulating liquid may contain, in addition to the above-mentioned mixtures, dimethylsulfoxide, dimethylformamide or dimethylacetamide. The most preferable coagulating liquid for the method of the present invention is water or a mixture of water with N-methylmorpholine-N-oxide. The coagulating liquid may contain a pH-adjusting agent, for example, acetic acid.

EXAMPLES

The present invention will be further explained by the following examples.

In the examples, the mixing ratio of the cellulose composition was based on weight. The degree of polymerization of cellulose was measured and determined in accordance with the method disclosed in B. DALBE, A. PEGUY, "CELLULOSE CHEMISTRY AND TECHNOLOGY", Vol. 24, No. 3, pages 327–331 (1990).

In this measurement method, as a solvent for cellulose, a mixture of N-methylmorpholine-N-oxide hydrate with dimethyl sulfoxide and propyl gallate with a weight ratio of 100/150/1 is used, cellulose is dissolved in a concentration of 0.2 to 0.8g/100 ml in the solvent, the viscosity of the cellulose solution is measured by using an Ubbelohde's dilution viscometer at a temperature of 34° C. and the intrinsic viscosity of the cellulose is determined in accordance with the viscosity equation:

$$[\eta]=1.99\times(DP)_v^{0.79}$$

wherein $[\eta]$ represents the intrinsic viscosity of the cellulose and $(DP)_v$ represents a degree of polymerization of the cellulose.

Example 1

A soft wood dissolved pulp NDPT (cellulose for component (I)) having a degree of polymerization of 1000 and available from Sanyo Kokusaku Pulp K. K., and a KC Flock pulp W-300 (cellulose for component (II)) having a degree of polymerization of 400 and available from Sanyo Kokusaku Pulp K. K. were mixed with each other in each of five different mixing weight ratios shown in Table 1, and the mixture was placed, together with 3000 g of N-methylmorpholine-N-oxide containing about 40% by weight of water and 15 g of propyl gallate, in a mixer equipped with a vacuum degassing device and available from Kodaira Seisakusho under a trademark of ACM-5. The mixture was heat-agitated under a reduced pressure for about 2 hours thereby to remove 968 g of water from the mixture. Five types of homogeneous solutions (samples 1 to 5) were obtained. During the dissolving operation, the temperature of a heating jacket was maintained at a level of 100° C., and the pressure of the mixture system was maintained at a level of 50 Torr (66.7 hPa).

Each of the resultant solutions was spread on a palette, sealed to prevent the absorption of moisture, and left to stand at room temperature for one day and night to solidify it.

The resultant solidified product was divided into pellets by a granulating machine. The pellets were fed into a monoscrew type extruder having a diameter of 20 mm, heat-redissolved, and then transferred to a spinning nozzle through a gear pump at a constant flow rate.

Each solution was extruded at a temperature of 100° C. to 135° C. through a spinning nozzle having 10 spinning orifices with a diameter of 500 μm and a ratio L/D of 20, and the extruded filamentary streams of the solution were passed through an air gap having a length of 60 cm and were directly wound on a winder, while coagulating the solution streams by sprinkling water toward the winder. The maximum winding velocity and spinning draft ratio (the ratio of winding velocity to extruding velocity) at an extruding velocity of 2.29 m/min are shown in Table 1.

TABLE 1

| Item | Sample No. | | | | |
|---|---|---|---|---|---|
| | 1 (Comparative) | 2 | 3 | 4 | 5 |
| Mixing ratio (NDPT/W-300) | 100/0 | 95/5 | 90/10 | 70/30 | 50/50 |
| Maximum winding velocity (m/min) | 750 | 800 | 930 | 1030 | 1300 |
| Spinning draft ratio | 328 | 349 | 403 | 450 | 568 |

Compared with Sample 1 made from the cellulose component (I) alone, Samples 2 to 5 made from mixtures of the cellulose component (I) with the cellulose component (II) exhibited an increased maximum winding velocity and an increased spinning draft ratio.

Example 2

Fine spinning dope solutions (samples 6 to 10) were prepared by the same procedures as in Example 1, except that two types of celluloses for the components (I) and (II) which were different in degree of polymerization from each other, were mixed as shown in Table 2. The resultant dope solutions were subjected to the same evaluation test of spinning property as in Example 1. The results are shown in Table 2.

As the low polymerization degree cellulose for the component (II), KC Flock W-50, W-100, W-200 and W-400, made by Sanyo Kokusaku Pulp K. K., and V-60 made by P & G Co, were used. The cellulose (NDPT) having a degree of polymerization of 1000 for the component (I) was mixed in an amount of 90% by weight with 10% by weight of the low polymerization degree cellulose for the component (II).

TABLE 2

| Item | Sample | | | | |
|---|---|---|---|---|---|
| | 6 | 7 | 8 | 9 | 10 |
| Type of component (II) cellulose | W-50 | W-100 | W-200 | W-400 | V-60 |
| Degree of polymerization of component (II) cellulose | 820 | 720 | 510 | 350 | 670 |
| Maximum winding velocity (m/min) | 940 | 850 | 920 | 1100 | 1000 |
| Spinning draft ratio | 410 | 371 | 402 | 480 | 436 |

In each example, adding the low polymerization degree cellulose (component (II)) resulted in the resultant dope cellulose solution having an increased maximum winding velocity and exhibiting an enhanced spinning property.

Example 3

Four spinning dope solutions (sample Nos. 11 to 14) were prepared by the same procedures as in Example 1, except that two types of cellulose for the components (I) and (II) which were different in degree of polymerization from each other as shown in Table 3, were mixed in the mixing ratio shown in Table 3. The resultant dope solutions were subjected to the same spinning property evaluation test as in Example 1. The results are shown in Table 3.

As the component (I) cellulose, an Acetania pulp having a degree of polymerization of 1950 was employed, and as the component (II) cellulose, KC Flack W-300 having a degree of polymerization of 400 was used.

TABLE 3

| Item | Sample No. | | | |
|---|---|---|---|---|
| | 11 | 12 | 13 | 14 |
| Mixing ratio (Acetania/W-300) | 100/0 | 95/5 | 90/10 | 70/30 |
| Maximum winding velocity (m/min) | 300 | 350 | ˙520 | 590 |
| Spinning draft ratio | 131 | 153 | 227 | 258 |

Example 4

Six dope solutions (sample Nos. 15 to 20) were prepared by the same procedure as in Example 1, except that two types of cellulose for the component (I) and the component (II) which were different in degree of polymerization from each other as shown in Table 4, were mixed in the mixing ratios shown in Table 4. The resultant dope solutions were subjected to the same spinning property evaluation as in Example 1. The results are shown in Table 4.

As the component (II) cellulose, cellulose V-81, V-60, and V-5S, made by P & G Co. were used in an amount of 90% by weight and mixed with 10% by weight of KC Flock W-300 having a degree of polymerization of 400.

TABLE 4

| Item | Sample No. | | | | | |
|---|---|---|---|---|---|---|
| | 15 | 16 | 17 | 18 | 19 | 20 |
| Type of component (II) cellulose | V-5S | V-5S | V-81 | V-81 | V-60 | V-60 |
| Degree of polymerization of component (II) cellulose | 1320 | 1320 | 720 | 720 | 670 | 670 |
| Mixing ratio (component (II) cellulose/W-300) | 100/0 | 90/10 | 100/0 | 90/10 | 100/0 | 90/10 |
| Maximum winding velocity (m/min) | 150 | 270 | 820 | 1100 | 1090 | 1410 |
| Spinning draft ratio | 66 | 118 | 358 | 480 | 476 | 616 |

Example 5

Five spinning dope solutions (sample Nos. 21 to 25) were prepared by the same procedures as in Example 1, except that the mixing ratio of the components were as shown in Table 5. Each dope solution was spun by using a spinning nozzle having 36 spinning orifices each having a diameter of 200 μm, and a ratio L/D of 15. In this spinning procedure, the maximum winding velocity and the spinning draft ratio at an extrusion linear rate of 7.96 m/min are shown in Table 5.

TABLE 5

| Item | Sample No. | | | | |
|---|---|---|---|---|---|
| | 21 | 22 | 23 | 24 | 25 |
| Mixing ratio (NDPT/W-300) | 100/0 | 95/5 | 90/10 | 70/30 | 50/50 |
| Maximum winding velocity (m/min) | 200 | 640 | 710 | 730 | 1000 |
| Spinning draft ratio | 25 | 80 | 89 | 92 | 126 |

EXAMPLE 6

Five spinning dope solutions (sample Nos. 26 to 30) were prepared, solidified, pelletized and re-dissolved by the same procedures as in Example 1, except that the cellulose components were mixed in the mixing ratios as shown in Table 1.

The spinning dope solutions were spun by the same procedures as in Example 1, except that the extrusion linear rate was 0.76 m/min, the coagulating bath consisted of pure water and the coagulating temperature was 25° C.

The resultant filaments passed through the coagulating bath were withdrawn from the bath through a calender roll, and wound around a bobbin by using a winder. The calender was roll rotated at a linear velocity of 90 m/min, and the spinning draft ratio was 118.

The cellulose filaments wound around the bobbin were washed in hot water at a temperature of 70° C. and then dried. The resultant cellulose filaments produced by the above-mentioned procedures had the physical properties shown in Table 6.

TABLE 6

| Item | Sample No. | | | | |
|---|---|---|---|---|---|
| | 26 | 27 | 28 | 29 | 30 |
| Mixing ratio (NDPT/W-300) | 100/0 | 95/5 | 90/10 | 70/30 | 50/50 |

TABLE 6-continued

| Item | Sample No. | | | | |
|---|---|---|---|---|---|
| | 26 | 27 | 28 | 29 | 30 |
| Thickness (denier) | 2.0 | 2.1 | 2.1 | 2.0 | 2.2 |
| Tensile strength (g/d) | 5.5 | 5.7 | 5.1 | 5.1 | 4.5 |
| Ultimate elongation (%) | 5.5 | 5.2 | 5.4 | 5.4 | 4.6 |

The mechanical properties of the filaments produced from the dope solutions (sample Nos. 27 to 30) each containing a blend of two types of cellulose were similar to those of the filaments produced from the dope solution (sample No. 26) containing a high polymerization degree cellulose alone.

Example 7

Five spinning dope solutions (sample Nos. 31 to 35) were prepared by the same procedures as in Example 6 except that two types of cellulose for the components (I) and (II) as shown in Table 7 were mixed with each other. The cellulose composition used for each dope solution contained 90% by weight of a component (I) cellulose having a degree of polymerization of 1000 and 10% by weight of a low polymerization degree component (II) cellulose.

As the component (II) cellulose, KC Flock W-50, W-100, W-200 and W-400 (made by Sanyo Kokusaku Pulp K. K.) and V-60 (made by P & G Co.) were employed.

The resultant filaments had the physical properties as shown in Table 7.

TABLE 7

| Item | Sample No. | | | | |
|---|---|---|---|---|---|
| | 31 | 32 | 33 | 34 | 35 |
| Type of component (II) cellulose | W-50 | W-100 | W-200 | W-400 | V-60 |
| Degree of polymerization of component (II) cellulose | 820 | 720 | 510 | 350 | 670 |
| Thickness (d) | 2.6 | 1.9 | 1.9 | 1.9 | 1.9 |
| Tensile strength (g/d) | 5.2 | 5.6 | 5.5 | 5.4 | 6.0 |
| Ultimate elongation (%) | 5.1 | 4.8 | 4.8 | 4.9 | 5.0 |

The mechanical properties of the filaments produced from the dope solutions (sample Nos. 31 to 35) each containing a blend of the two types of cellulose were similar to those of the filaments produced from the dope solution (sample No. 26) containing a high polymerization degree cellulose alone.

Example 8

A cellulose composition was prepared by mixing 249.3 g of a component (I) consisting of soft wood dissolved pulp NDPT (cellulose) made by Sanyo Kokusaku Pulp K. K., and having a degree of polymerization of 1000 with 27.7 g of a component (II) consisting of cellulose diacetate MBH made by Daicel Kagaku K. K. in a mixing weight ratio of 90/10. The cellulose composition was phased together with 3000 g of N-methylmorpholine-N-oxide containing about 40% by weight of water and 15 g of propyl gallate into a mixer (Type ACM-5) equipped with a vacuum degassing device and made by Kodaira Seisakusho, and mixed together under reduced pressure for about 2 hours while heating, to remove water in an amount of 968 g. A homogeneous solution containing cellulose and cellulose diacetate was obtained. During the dissolving procedure, the jacket temperature of the mixer was maintained at 100° C.

The resultant dope solution containing the cellulose diacetate was subjected to the same spinning property evaluation as in Example 1. The results are shown in Table 8.

TABLE 8

| Component (I): Type of cellulose | NDPT |
|---|---|
| Component (II): Type of diacetate | MBH |
| Mixing ratio (component (I)/component (II)) | 90/10 |
| Maximum winding velocity (m/min) | 1100 |
| Maximum draft ratio | 480 |

Example 9

A dope solution was prepared by the same procedures as in Example 8, except that the composition of the cellulose with the cellulose diacetate was changed as indicated below and subjected to the same spinning property evaluation as in Example 8.

The cellulose composition was prepared by mixing a component (I) consisting of 276.4 g of a dissolved pulp V-60 having a degree of polymerization of cellulose of 670 and made by P & G Cellulose Co. with 69.1 g of a component (I) consisting of cellulose diacetate MBH made by Daicel Kagaku K. K., in a mixing weight ratio of 80/20, and placed together with 3000 g of N-methylmorpholine-N-oxide containing about 40% by weight of water and 15 g of propyl gallate into a mixer (type ACM-5) equipped with a vacuum degassing device. The mixture was stirred under reduced pressure with heating for about 2 hours, to remove 1041 g of water. A homogeneous solution of cellulose and cellulose diacetate was obtained. During the dissolving procedure, the jacket temperature of the mixer was maintained at 100° C.

The spinning property of the spinning dope solution containing the cellulose diacetate was evaluated by the same test as in Example 1. The results are shown in Table 9.

TABLE 9

| Component (I): Type of cellulose | V-60 |
|---|---|
| Component (II): Type of cellulose diacetate | MBH |
| Mixing ratio: component (I)/component (II) | 80/20 |
| Maximum winding velocity (m/min) | 1300 |
| Maximum draft ratio | 567 |

Example 10

A dope solution was prepared by the same procedures as in Example 8, except that the composition of the cellulose with the cellulose diacetate was changed as indicated below and subjected to the same spinning property evaluation as in Example 8.

The cellulose composition was prepared by mixing a component (I) consisting of 172.8 g of soft wood dissolved pulp NDPT (cellulose) made by Sanyo Kokusaku Pulp K. K. and having a degree of polymerization of 1000, or 172.8 g of a dissolved pulp V-60 having a degree of polymerization of cellulose of 670 and made by P & G Cellulose Co. with a component (I) consisting of 172.8 g of cellulose diacetate MBH made by Daicel Kagaku K. K., or 172.8 g of cellulose diacetate YBA made by Daicel Kagaku K. K., in a mixing weight ratio of 50/50. The cellulose composition was placed together with 3000 g of N-methylmorpholine-N-oxide containing about 40% by weight of water and 15 g of propyl gallate into a mixer (type ACM-5) equipped with a vacuum degassing device. The mixture, was stirred under reduced pressure with heating for about 2 hours, to remove 1038 g of water. A homogeneous solution of cellulose and cellulose diacetate was obtained. During the dissolving procedure, the jacket temperature of the mixer was maintained at 100° C.

The spinning property of the spinning dope solution containing the cellulose diacetate was evaluated by the same test as in Example 1. The results are shown in Table 10.

TABLE 10

| Component (I): Type of cellulose | NDPT | NDPT | V-60 |
|---|---|---|---|
| Component (II): Type of cellulose diacetate | MBH | YBA | YBA |
| Mixing ratio: component (I)/component (II) | 50/50 | 50/50 | 50/50 |
| Maximum winding velocity (m/min) | 1375 | 1245 | 1500< |
| Maximum draft ratio | 600 | 543 | 655< |

Example 11

Four spinning dope solutions having the compositions shown in Table 11 were prepared by the same procedures as in Examples 9 and 10. The dope solutions were subjected to a spinning procedure by using a metal nozzle having 36 spinning orifices each having a orifice diameter of 200 μm and a ratio L/D of 15. The maximum winding velocities and the spinning draft ratios at an extrusion linear rate of 7.96 m/min are shown in Table 11.

TABLE 11

| Component (I): Type of cellulose | V-60 | NDPT | NDPT | V-60 |
|---|---|---|---|---|
| Component (II): Type of cellulose diacetate | MBH | MBH | YBA | YBA |
| Mixing ratio: component (I)/component (II) | 80/20 | 50/50 | 50/50 | 50/50 |
| Maximum winding velocity (m/min) | 860 | 1060 | 1210 | 1133 |
| Maximum draft ratio | 108 | 133 | 152 | 142 |

Example 12

A cellulose composition was prepared by mixing a component (I) consisting of 249.3 g of soft wood dissolved pulp NDPT (cellulose) having a degree of cellulose polymerization of 1000 and made by Sanyo Kokusaku Pulp K. K. with a component (II) consisting of 27.7 g of β-1,3-glucose which is a polysaccharide and available under a trademark of cardran from Wako Junyaku K. K., in a mixing weight ratio of 90/10.

This cellulose composition was placed together with 3000 g of N-methylmorpholine-N-oxide containing about 40% by weight of water and 15 g of propyl gallate into a mixer (Type ACM-5) equipped with a vacuum degassing device and made by Kodaira Seisakusho. The mixture was stirred under a reduced pressure while heating it for about 2 hours, to remove 968 g of water. A homogenous solution of cellulose and cardran was obtained. During the dissolving procedure, the jacket temperature of the mixer was maintained at 100° C.

The spinning property of the dope solution containing the cardran was evaluated by the same test as in Example 1. The results are shown in Table 12.

TABLE 12

| Component (I): Type of cellulose | NDPT |
|---|---|
| Component (II): Type of polysaccharide | Cardran |
| Mixing ratio: component (I)/component (II) | 90/10 |
| Maximum winding velocity (m/min) | 1150 |
| Maximum draft ratio | 502 |

Example 13

A cellulose composition was prepared by mixing a component (I) consisting of 311.0 g of dissolved pulp V-60 (cellulose 1) made by P & G Cellulose Co. and having a degree of cellulose polymerization of 670 with a component (II) consisting of 34.56 g of KC Flock W-300 (cellulose 2) having a degree of cellulose polymerization of 400 and made by Sanyo Kokusaku Pulp K. K., in a mixing weight ratio of 90/10. The cellulose composition was placed together with 3000 g of N-methylmorpholine-N-oxide containing about 40% by weight of water and 15 g of propyl gallate in a mixer (Type ACM-5) equipped with a vacuum degassing device and made by Kodaira Seisakusho. The mixture was stirred under reduced pressure with heating for about 2 hours, to remove 1038 g of water. A homogeneous solution of cellulose was obtained. During the dissolving procedure, the jacket temperature of the mixer was maintained at 100° C.

The cellulose solution was extruded at a spinning temperature of 130° C. through a spinning nozzle made from a ceramic or metal and having 36 spinning orifices with a diameter of 300 μm and a ratio L/D of 15, the extruded filamentary solution streams were passed through an air gap with a length of 50 cm and then directly wound up on a winder. In this case, the filamentary streams were coagulated by sprinkling water toward the winder. The maximum winding velocity and spinning draft ratio (the ratio of winding velocity to extrusion liner rate) at an extrusion velocity of 1.18 m/min were measured. The results are shown in Table 13.

The same procedures as mentioned above were repeated except that the mixing ratio of component (I) cellulose with component (II) cellulose was changed to 70/30. The results are shown in Table 13.

TABLE 13

| Component (I): Type of cellulose 1 | V-60 | | | |
|---|---|---|---|---|
| Component (II): Type of cellulose 2 | W-300 | | | |
| Mixing ratio: component (I)/component (II) | 90/10 | | 70/30 | |
| Nozzle-making material | Ceramics | Metal | Ceramics | Metal |
| Maximum winding velocity (m/min) | 900 | 685 | 920 | 800 |
| Maximum draft ratio | 763 | 581 | 780 | 678 |

INDUSTRIAL APPLICABILITY

[Industrial Applicability]

The solution of the present invention of a component (I) consisting of a high molecular weight cellulose and a component (II) consisting of a low molecular weight cellulose, cellulose derivative and/or polysaccharide in the specific mixed solvent has an excellent solution fluidity compared with that of a solution of the high molecular weight cellulose alone.

By employing the cellulose composition solution, shaped cellulose articles having mechanical properties similar to those of the shaped article produced from a solution of high molecular weight cellulose alone can be produced at a high productivity.

We claim:

1. A cellulose solution for shaping, comprising a cellulose composition dissolved in a mixed solvent comprising N-methylmorpholine-N-oxide and another solvent material uniformly compatible with N-methylmorpholine-N-oxide but not capable of dissolving cellulose therein, said cellulose composition comprising a mixture of:
   (1) a component (I) comprising a cellulose having a degree of polymerization of 500 to 2,000; and
   (2) a component (II) comprising at least one member selected from the group consisting of celluloses having a degree of polymerization corresponding to 90% or less of that of the cellulose for the component (I) and being in the range of from 350 to 900, cellulose diacetate, cellulose triacetate, hydroxypropyl cellulose, hydroxypropylmethyl cellulose, methyl cellulose, and polysaccharides, and the mixing ratio in weight of the component (I) to the component (I) being in the range of from 95:5 to 50:50.

2. The cellulose solution as claimed in claim 1, wherein the cellulose of the component (I) has a degree of polyerization of 1000 to 2000.

3. The cellulose solution as claimed in claim 1, wherein the cellulose derivative for the component (II) is cellulose diacetate.

4. The cellulose solution as claimed in claim 1, wherein the polysaccharide for the component (II) is β-1,3-glucose.

5. A method of producing a shaped article from the cellulose solution as claimed in claim 1, comprising:

shaping the cellulose solution into a stream thereof having a desired form; and solidifying the shaped cellulose solution stream by bringing it into contact with a coagulating liquid.

6. The method as claimed in claim 5, wherein the cellulose solution is extruded to the air atmosphere through a spinning nozzle having at least one spinning orifice; the extruded filamentary cellulose solution stream is brought into contact with the coagulating liquid to coagulate it while applying a draft thereto; and the coagulated cellulose filament is taken up from the coagulating liquid.

7. The method as claimed in claim 6, wherein the taking up step is carried out at a velocity of 500 m/min. or more.

8. The method as claimed in claim 6, wherein the spinning orifice of the spinning nozzle has an inside diameter of 200 μm, and a ratio L/D of a length L of the spinning orifice to the inside diameter D of the spinning orifice, of 10 or more.

9. The method as claimed in claim 6, wherein the ratio L/D is 15 or more.

10. The method as claimed in claim 6, wherein the spinning nozzle is one made from a ceramic.

* * * * *